United States Patent [19]
Aho

[11] Patent Number: 6,083,097
[45] Date of Patent: Jul. 4, 2000

[54] FISH SKINNER

[76] Inventor: Wayne F. Aho, P.O. Box 971531, Ypsilanti, Mich. 48197

[21] Appl. No.: 09/339,798

[22] Filed: Jun. 24, 1999

[51] Int. Cl.[7] .................................................. A22C 25/17
[52] U.S. Cl. ........................................ 452/127; 452/161
[58] Field of Search ................... 452/161, 127, 452/128

[56] References Cited

U.S. PATENT DOCUMENTS

| | | | |
|---|---|---|---|
| 3,052,914 | 9/1962 | Luedtke | 452/161 |
| 3,164,858 | 1/1965 | De Moss | 452/127 |
| 3,934,310 | 1/1976 | Barters et al. | 452/127 |
| 4,602,404 | 7/1986 | Betnar | 452/161 |
| 4,761,855 | 8/1988 | Peters | 452/161 |
| 5,336,125 | 8/1994 | Despointes | 452/127 |

*Primary Examiner*—Willis Little

[57] ABSTRACT

A fish skinner for skinning a fish. The fish skinner includes a base with an elongate arm upwardly extending therefrom. One end of an elongate lower bar is coupled to the arm. One end of an elongate upper bar is pivotally coupled to the arm above the lower bar. The lower bar has an upper cutting edge against which a lower face of the upper bar abuts when the upper bar is pivoted to a lowered position.

5 Claims, 2 Drawing Sheets

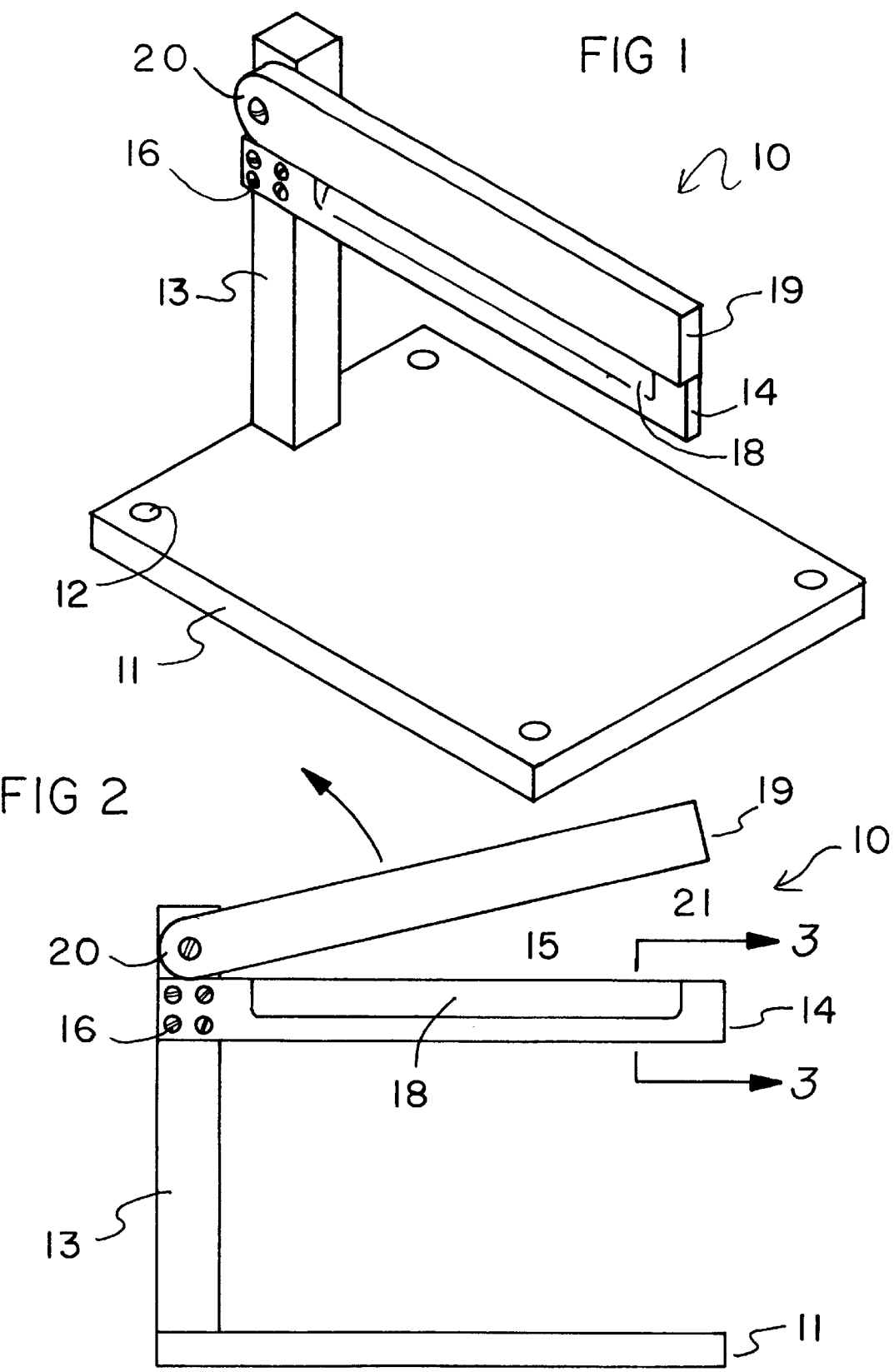

FISH SKINNER

BACKGROUND OF THE INVENTION

1. Field of the Invention

The present invention relates to devices for skinning fish and more particularly pertains to a new fish skinner for skinning a fish.

2. Description of the Prior Art

The use of devices for skinning fish is known in the prior art. More specifically, devices for skinning fish heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,453,042; U.S. Pat. No. 3,299,926; U.S. Pat. No. 4,378,613; U.S. Pat. No. 3,164,858; U.S. Pat. No. 4,602,404; and U.S. Pat. No. Des. 175,671.

While these devices fulfill their respective, particular objectives and requirements, the aforementioned patents do not disclose a new fish skinner. The inventive device includes a base with an elongate arm upwardly extending therefrom. One end of an elongate lower bar is coupled to the arm. One end of an elongate upper bar is pivotally coupled to the arm above the lower bar. The lower bar has an upper cutting edge against which a lower face of the upper bar abuts when the upper bar is pivoted to a lowered position.

In these respects, the fish skinner according to the present invention substantially departs from the conventional concepts and designs of the prior art, and in so doing provides an apparatus primarily developed for the purpose of skinning a fish.

SUMMARY OF THE INVENTION

In view of the foregoing disadvantages inherent in the known types of devices for skinning fish now present in the prior art, the present invention provides a new fish skinner construction wherein the same can be utilized for skinning a fish.

The general purpose of the present invention, which will be described subsequently in greater detail, is to provide a new fish skinner apparatus and method which has many of the advantages of the devices for skinning fish mentioned heretofore and many novel features that result in a new fish skinner which is not anticipated, rendered obvious, suggested, or even implied by any of the prior art devices for skinning fish, either alone or in any combination thereof.

To attain this, the present invention generally comprises a base with an elongate arm upwardly extending therefrom. One end of an elongate lower bar is coupled to the arm. One end of an elongate upper bar is pivotally coupled to the arm above the lower bar. The lower bar has an upper cutting edge against which a lower face of the upper bar abuts when the upper bar is pivoted to a lowered position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fish skinner apparatus and method which has many of the advantages of the devices for skinning fish mentioned heretofore and many novel features that result in a new fish skinner which is not anticipated, rendered obvious, suggested, or even implied by any of the prior art devices for skinning fish, either alone or in any combination thereof.

It is another object of the present invention to provide a new fish skinner which may be easily and efficiently manufactured and marketed.

It is a further object of the present invention to provide a new fish skinner which is of a durable and reliable construction.

An even further object of the present invention is to provide a new fish skinner which is susceptible of a low cost of manufacture with regard to both materials and labor, and which accordingly is then susceptible of low prices of sale to the consuming public, thereby making such fish skinner economically available to the buying public.

Still yet another object of the present invention is to provide a new fish skinner which provides in the apparatuses and methods of the prior art some of the advantages thereof, while simultaneously overcoming some of the disadvantages normally associated therewith.

Still another object of the present invention is to provide a new fish skinner for skinning a fish.

Yet another object of the present invention is to provide a new fish skinner which includes a base with an elongate arm upwardly extending therefrom. One end of an elongate lower bar is coupled to the arm. One end of an elongate upper bar is pivotally coupled to the arm above the lower bar. The lower bar has an upper cutting edge against which a lower face of the upper bar abuts when the upper bar is pivoted to a lowered position.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new fish skinner according to the present invention.

FIG. 2 is a schematic side view of the present invention with the upper bar pivoted to a raised position.

DETAILED DESCRIPTION OF THE INVENTION

Figure 3:
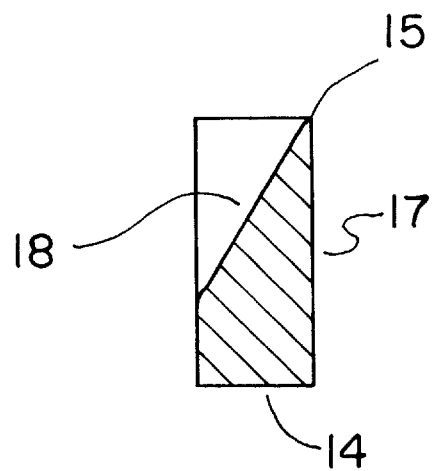
FIG. 3 is a schematic transverse cross sectional view of the lower bar taken from line 3—3 of FIG. 2.

With reference now to the drawings, and in particular to FIGS. 1 through 4 thereof, a new fish skinner embodying the principles and concepts of the present invention and generally designated by the reference numeral 10 will be described.

As best illustrated in FIGS. 1 through 4, the fish skinner 10 generally comprises a base with an elongate arm upwardly extending therefrom. One end of an elongate lower bar is coupled to the arm. One end of an elongate upper bar is pivotally coupled to the arm above the lower bar. The lower bar has an upper cutting edge against which a lower face of the upper bar abuts when the upper bar is pivoted to a lowered position.

In closer detail, the fish skinner 10 comprises a substantially planar base 11 for resting on a resting surface that has a generally rectangular outer perimeter comprising a plurality of sides and corners. In one embodiment, the base may have a length defined between a first opposite pair of the sides of the base of about 16 inches and a width defined between a second opposite pair of the sides of about 12 inches for providing sufficient stability to the fish skinner during use when rested on the resting surface.

The base may also have a plurality of circular mounting holes 12 therethrough for extending fasteners therethrough into the resting surface to secure the base to the resting surface. In one embodiment, each mounting hole may be positioned adjacent an associated one of the corners of the base.

An elongate arm 13 is upwardly extended from the base. The arm may be extended substantially perpendicular to the base. The arm has opposite top and bottom ends. The bottom end of the arm is coupled to the base adjacent a first of the sides of the base.

The fish skinner also includes an elongate lower bar 14 having a pair of opposite ends, and an upper cutting edge 15. A first of the ends of the lower bar is coupled to the arm towards the top end of the arm by four fasteners 16 in one embodiment. A second of the ends of the lower bar is outwardly extended from the arm over the base. In one embodiment, the lower bar may be extended substantially perpendicular to the arm and substantially parallel to the base.

The upper cutting edge of the lower bar faces upwardly away from the base and extending substantially parallel to the base. In one embodiment, as best illustrated in FIG. 3, the lower bar has a pair of side faces 17,18 converging together to form the upper cutting edge of the lower bar. A first of side faces of the lower bar lies in a plane extending substantially perpendicular to the base. A second of the side faces of the lower bar lie in a plane extending at an acute angle from the first side face of the lower bar.

The fish skinner further includes an elongate upper bar 19 having a pair of opposite ends. A first of the ends 20 of the upper bar is pivotally coupled to the arm between the top end of the bar and the first end of the lower bar so that the upper bar is positioned above the lower bar. In one embodiment, the first end of the upper bar may be rounded to have an outwardly facing convexity to permit unhindered pivoting of the upper bar.

Figure 4:
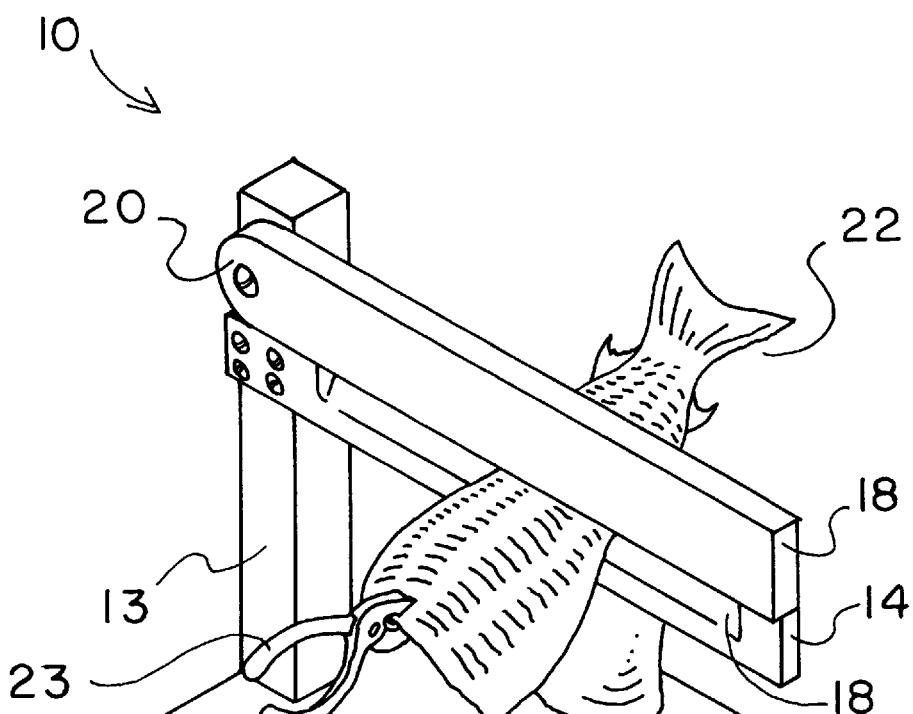
FIG. 4 is a schematic perspective view of the present invention in use removing the skin from one side of a fish.

In use, the upper bar is pivotable between raised and lowered positions. As best illustrated in FIGS. 1 and 4, the upper and lower bars are extended substantially parallel to each other when the upper bar is positioned in the lowered position. In this lowered position, a second of the ends of the upper bar is positioned adjacent the second end of the lower bar. The upper bar has a lower face 21 extending between the first and second ends of the upper bar, the lower face of the upper bar abutting the upper cutting edge of the lower bar when the upper bar is positioned in the lowered position.

With particular reference to FIG. 2, the second end of the upper bar is spaced apart from the second end of the lower bar when the upper bar is positioned in the raised position. The lower face of the upper bar is spaced apart from the upper cutting edge of the lower bar when the upper bar is positioned in the raised position.

The upper and lower bars each have a length defined between the ends of the respective bar. In one embodiment, the lengths of the upper and lower bars are equal to each other. In one illustrative embodiment, the length of each bar may be about 14 inches. In this embodiment, the length of the upper cutting edge may be about 10 inches.

In one illustrative embodiment, the base, arm and upper bar may comprise a wood material, while the lower bar may comprise a metal material to help keep the upper cutting edge sharp.

In use, the fish skinner is used in conjunction with a provided fish 22. The head and dorsal fin of the fish are first cut out and the internal organs of the fish are also removed. A portion of skin of the fish is grasped between opposing jaws of a pliers 23 adjacent the cutoff head end of the fish. With the pliers, a user then peels the skin of the fish back towards the cutoff dorsal fin region of the fish with the pliers. In one embodiment, the skin may be peeled off about ½ inch.

The upper bar is pivoted from the raised position to the lower position to hold the peeled back portion of the skin of the fish between the upper cutting edge of the lower bar and the lower face of the upper bar such that the remainder of the fish is position on the first side face side of the lower bar and the pliers are positioned on the second side face side of the lower bar. The user holds the second ends of the upper and lower bars together with a hand of the user so that the hand of the user applies pressure to keep second ends of the upper and lower bars together.

The skin of the fish is pulled in a downwards direction with the pliers so that one side of the skin of the fish is passed between the upper cutting edge and the lower face of the upper bar and removed from the remainder fish which is left on the other side of the upper and lower bars. The above steps are repeated to remove the skin of the fish from the other side of the fish.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fish skinner, comprising:

a base;

an elongate arm being upwardly extended from said base;

an elongate lower bar having a pair of opposite ends, and an upper cutting edge;

a first of said ends of said lower bar being coupled to said arm;

an elongate upper bar having a pair of opposite ends;

a first of said ends of said upper bar being pivotally coupled to said arm above said first end of said lower bar; and said upper bar being pivotable to a lowered position where a lower face of said upper bar abuts said upper cutting edge of said lower bar; whereby, the skin of a fish is removed as said skin is pulled between said upper and lower bars.

2. The fish skinner of claim 1, wherein said base has a plurality of mounting holes therethrough for extending fasteners therethrough to secure said base to a resting surface.

3. The fish skinner of claim 1, wherein said arm is extended substantially perpendicular to said base, wherein said upper and lower bars are extended substantially perpendicular to said arm and substantially parallel to said base.

4. A fish skinner, comprising:

a substantially planar base for resting on a resting surface and having a generally rectangular outer perimeter comprising a plurality of sides and corners;

said base having a plurality of circular mounting holes therethrough for extending fasteners therethrough into the resting surface to secure said base to the resting surface;

each mounting hole being positioned adjacent an associated one of said corners of said base;

an elongate arm being upwardly extended from said base;

said arm being extended substantially perpendicular to said base;

said arm having opposite top and bottom ends, said bottom end of said arm being coupled to said base adjacent a first of said sides of said base;

an elongate lower bar having a pair of opposite ends, and an upper cutting edge;

a first of said ends of said lower bar being coupled to said arm towards said top end of said arm;

a second of said ends of said lower bar being outwardly extended from said arm over said base;

said lower bar being extended substantially perpendicular to said arm and substantially parallel to said base;

said upper cutting edge of said lower bar facing upwardly away from said base and extending substantially parallel to said base;

said lower bar having a pair of side faces converging together to form said upper cutting edge of said lower bar;

a first of side faces of said lower bar lying in a plane extending substantially perpendicular to said base;

a second of said side faces of said lower bar lying in a plane extending at an acute angle from said first side face of said lower bar;

an elongate upper bar having a pair of opposite ends;

a first of said ends of said upper bar being pivotally coupled to said arm between said top end of said bar and said first end of said lower bar so that said upper bar is positioned above said lower bar;

said upper bar being pivotable between raised and lowered positions;

said upper and lower bars being extended substantially parallel to each other when said upper bar is positioned in said lowered position;

a second of said ends of said upper bar being positioned adjacent said second end of said lower bar when said upper bar is positioned in said lowered position;

said upper bar having a lower face extending between said first and second ends of said upper bar, said lower face of said upper bar abutting said upper cutting edge of said lower bar when said upper bar is positioned in said lowered position;

said second end of said upper bar being spaced apart from said second end of said lower bar when said upper bar is positioned in said raised position; and said lower face of said upper bar being spaced apart from said upper cutting edge of said lower bar when said upper bar is positioned in said raised position.

5. A method for skinning a fish, comprising:

providing a fish skinner, comprising:

a substantially planar base for resting on a resting surface and having a generally rectangular outer perimeter comprising a plurality of sides and corners;

said base having a plurality of circular mounting holes therethrough for extending fasteners therethrough into the resting surface to secure said base to the resting surface;

each mounting hole being positioned adjacent an associated one of said corners of said base;

an elongate arm being upwardly extended from said base;

said arm being extended substantially perpendicular to said base;

said arm having opposite top and bottom ends, said bottom end of said arm being coupled to said base adjacent a first of said sides of said base;

an elongate lower bar having a pair of opposite ends, and an upper cutting edge;

a first of said ends of said lower bar being coupled to said arm towards said top end of said arm;

a second of said ends of said lower bar being outwardly extended from said arm over said base;

said lower bar being extended substantially perpendicular to said arm and substantially parallel to said base;

said upper cutting edge of said lower bar facing upwardly away from said base and extending substantially parallel to said base;

said lower bar having a pair of side faces converging together to form said upper cutting edge of said lower bar;

a first of side faces of said lower bar lying in a plane extending substantially perpendicular to said base;

a second of said side faces of said lower bar lying in a plane extending at an acute angle from said first side face of said lower bar;

an elongate upper bar having a pair of opposite ends;

a first of said ends of said upper bar being pivotally coupled to said arm between said top end of said bar and said first end of said lower bar so that said upper bar is positioned above said lower bar;

said upper bar being pivotable between raised and lowered positions;

said upper and lower bars being extended substantially parallel to each other when said upper bar is positioned in said lowered position;

a second of said ends of said upper bar being positioned adjacent said second end of said lower bar when said upper bar is positioned in said lowered position;

said upper bar having a lower face extending between said first and second ends of said upper bar, said lower face of said upper bar abutting said upper cutting edge of said lower bar when said upper bar is positioned in said lowered position;

said second end of said upper bar being spaced apart from said second end of said lower bar when said upper bar is positioned in said raised position;

said lower face of said upper bar being spaced apart from said upper cutting edge of said lower bar when said upper bar is positioned in said raised position;

providing a fish;

cutting off a head and dorsal fin of the fish;

removing internal organs of the fish;

providing pliers having a pair of opposing jaws;

grasping of portion of skin of the fish adjacent the cutoff head end of the fish;

peeling the skin of the fish back towards the cutoff dorsal fin region of the fish with the pliers;

pivoting the upper bar from the raised position to the lower position to hold the peeled back portion of the skin of the fish between the upper cutting edge of the lower bar and the lower face of the upper bar such that the remainder of the fish is position on the first side face side of the lower bar and the pliers are positioned on the second side face side of the lower bar;

holding said second ends of said upper and lower bars together; and pulling the skin in a downwards direction with the pliers so that one side of the skin of the fish is passed between the upper cutting edge and the lower face of the upper bar and removed from the remainder fish.

\* \* \* \* \*